(12) United States Patent
Kramer et al.

(10) Patent No.: US 11,306,208 B2
(45) Date of Patent: Apr. 19, 2022

(54) PRODUCT HAVING ULTRAVIOLET RADIATION PROTECTION

(71) Applicant: The Sweet Living Group, LLC, St. Louis, MO (US)

(72) Inventors: Robert B Kramer, St. Louis, MO (US); Ronald Kramer, St. Louis, MO (US); Nicholas Marshall, Berea, KY (US)

(73) Assignee: The Sweet Living Group, LLC, Virginia Beach, VA (US)

( * ) Notice: Subject to any disclaimer, the term of this patent is extended or adjusted under 35 U.S.C. 154(b) by 0 days.

(21) Appl. No.: 17/227,504

(22) Filed: Apr. 12, 2021

(65) Prior Publication Data

US 2021/0230429 A1    Jul. 29, 2021

Related U.S. Application Data

(63) Continuation of application No. 16/699,911, filed on Dec. 2, 2019, now Pat. No. 11,001,712, which is a
(Continued)

(51) Int. Cl.
| | | |
|---|---|---|
| *C09C 1/04* | (2006.01) | |
| *C01G 9/02* | (2006.01) | |
| *C01G 9/03* | (2006.01) | |
| *D06M 11/44* | (2006.01) | |
| *D06M 23/08* | (2006.01) | |
| *C08K 9/02* | (2006.01) | |
| *C08K 9/06* | (2006.01) | |
| *D01F 1/10* | (2006.01) | |
| *C08K 9/04* | (2006.01) | |
| *C09C 3/12* | (2006.01) | |
| *C08K 3/22* | (2006.01) | |
| *C11D 3/12* | (2006.01) | |
| *D06M 11/46* | (2006.01) | |
| *D06M 11/50* | (2006.01) | |
| *D06M 11/70* | (2006.01) | |
| *D06M 13/288* | (2006.01) | |
| *D06M 13/325* | (2006.01) | |
| *D06M 13/368* | (2006.01) | |
| *D06M 13/432* | (2006.01) | |
| *D06M 13/51* | (2006.01) | |

(Continued)

(52) U.S. Cl.
CPC .............. *C09C 1/043* (2013.01); *C01G 9/02* (2013.01); *C01G 9/03* (2013.01); *C08K 9/02* (2013.01); *C08K 9/04* (2013.01); *C08K 9/06* (2013.01); *D01F 1/106* (2013.01); *D06M 11/44* (2013.01); *D06M 23/08* (2013.01); *C01P 2004/64* (2013.01); *C01P 2004/84* (2013.01); *C08K 3/22* (2013.01); *C08K 2003/2296* (2013.01); *C09C 3/12* (2013.01); *C11D 3/1213* (2013.01); *D06M 11/46* (2013.01); *D06M 11/50* (2013.01); *D06M 11/70* (2013.01); *D06M 13/288* (2013.01); *D06M 13/325* (2013.01); *D06M 13/368* (2013.01); *D06M 13/432* (2013.01); *D06M 13/51* (2013.01); *D06M 2101/06* (2013.01); *D06M 2101/32* (2013.01); *D06M 2101/34* (2013.01); *D06M 2200/25* (2013.01); *D06M 2400/01* (2013.01); *D06M 2400/02* (2013.01)

(58) Field of Classification Search
CPC .. C09C 1/043; C09C 3/12; C01G 9/02; C01G 9/03; C08K 3/22; C08K 9/02; C08K 9/04; C08K 9/06; C08K 2003/2296; D01F 1/106; D06M 11/44; D06M 11/46; D06M 11/50; D06M 11/70; D06M 13/288; D06M 13/325; D06M 13/368; D06M 13/432; D06M 13/51; D06M 23/08; D06M 2101/06; D06M 2101/32; D06M 2101/34; D06M 2200/25; D06M 2400/01; D06M 2400/02; C01P 2004/64; C01P 2004/84; C11D 3/1213
See application file for complete search history.

(56) References Cited

U.S. PATENT DOCUMENTS

| | | | | |
|---|---|---|---|---|
| 5,503,840 A | * | 4/1996 | Jacobson | A01N 25/26 424/404 |
| 6,034,003 A | | 3/2000 | Lee | |

(Continued)

FOREIGN PATENT DOCUMENTS

WO    WO 2010/018075    2/2010

OTHER PUBLICATIONS

Vikram P Dhende et al., One-Step Photochemical Synthesis of Permanent, Nonleaching, Ultrathin Antimicrobial Coatings for Textiles and Plastics, ACS Applied Materials and Interfaces Forum Article, American Chemical Society, Jun. 21, 2011, 2830-2837.

Nina Griep-Raming et al., Using Benzophenone-Functionalized Phosphonic Acid to Attache Thin Polymer Films to Titanium Surfaces, Langmuir, 2004, 11811-11814.

(Continued)

*Primary Examiner* — Pegah Parvini
*Assistant Examiner* — Ross J Christie
(74) *Attorney, Agent, or Firm* — David H. Chervitz

(57) ABSTRACT

A product for incorporating ultraviolet radiation protection and antimicrobial protection into a synthetic polymer is disclosed which has a quantity of zinc oxide particles modified with a layer of a reactive group that forms a bond with a quantity of synthetic polymer chips having C—H bonds. A product for incorporating ultraviolet radiation protection and antimicrobial protection into a synthetic polymer prior to forming a synthetic material is also disclosed which has a quantity of synthetic polymer chips and a quantity of zinc oxide particles modified with a layer of a reactive group that forms a bond with the quantity of the synthetic polymer chips.

20 Claims, No Drawings

Related U.S. Application Data continuation of application No. 15/951,834, filed on Apr. 12, 2018, now Pat. No. 10,494,528, which is a continuation of application No. 15/064,242, filed on Mar. 8, 2016, now abandoned, and a continuation-in-part of application No. 14/833,317, filed on Aug. 24, 2015, now Pat. No. 9,404,214, and a continuation-in-part of application No. 14/245,152, filed on Apr. 4, 2014, now Pat. No. 9,150,824, and a continuation-in-part of application No. 13/632,223, filed on Oct. 1, 2012, now Pat. No. 8,690,964, and a continuation-in-part of application No. 13/317,152, filed on Oct. 11, 2011, now Pat. No. 8,277,518.

(51) Int. Cl.
   *D06M 101/06* (2006.01)
   *D06M 101/32* (2006.01)
   *D06M 101/34* (2006.01)

(56) References Cited

U.S. PATENT DOCUMENTS

| | | | |
|---|---|---|---|
| 6,200,680 B1* | 3/2001 | Takeda | A61K 8/27 423/111 |
| 6,607,994 B2* | 8/2003 | Soane | D06M 16/00 428/402 |
| 7,262,160 B2 | 8/2007 | Black | |
| 7,754,625 B2 | 7/2010 | Hendriks et al. | |
| 11,001,712 B2* | 5/2021 | Kramer | C01G 9/02 |
| 2004/0074012 A1* | 4/2004 | Heidenfelder | C11D 3/0018 8/115.51 |
| 2005/0175530 A1 | 8/2005 | Baglioni et al. | |
| 2008/0038472 A1* | 2/2008 | Suzuki | B05D 1/36 427/384 |
| 2009/0233507 A1 | 9/2009 | Gross et al. | |

OTHER PUBLICATIONS

A. Yadav et al., Functional finishing in cotton fabrics using zinc oxide nanoparticles, Bullentin of Material Sciences, vol. 29, No. 6, Nov. 2006, 641-645.

Y.L. Lam et al., Effect of zinc oxide on flame retardant finishing of plasma pre-treated cotton fabric, Cellulose (2011) 18:151-165.

Blanchard and Graves, Phosphorylation of Cellulose with Some Phosphonic Acid Derivatives, Textile Research Journal, 2003, 73, 22-26.

Fangli et al., Preparation and properties of zinc oxide nanoparticles coated with zinc aluminate, Journal of Materials Chemistry, 2003, 13, 634-637.

Gelest, Inc., "Silane coupling agents: connecting across boundaries." http://www.gelest.com/pdf/couplingagents.pdf, 60 pages, undated but prior to Oct. 11, 2011.

Hau et al., Effect of Chemical Modification of Fullerene-Based Self-Assembled Monolayers on the Performance of Inverted Polymer Solar Cells, 2010(7), 1892-1902.

Lu and Ng, Efficient, One-Step Mechanochemical Process for the Synthesis of ZnO Nanoparticles, Industrial Engineering Chemical Reasearch, 2008, 47, 1095-1101.

Law et al., ZnO—Al2O3 and ZnO—TiO2 Core—Shell Nanowire Dye-Sensitized Solar Cells, Journal of Physical Chemistry B, 2006, 110(45), 22652-22663.

Perez et al., TEMPO-Mediated Oxidation of Cellulose III, Biomacromolecules, 2005, 17(20), 5048-5056.

Turgeman et al., Crystallization of Highly Oriented ZnO Microrods on Carboyxlic Acid-Terminated SAMs, Chemistry of Materials, 2005, 26(6), 4514-4522.

Zhang et al., Surface Functionalization of Zinc Oxide by Carboxyalkylphosphonic Acid Self-Assembled Monolayers, Langmuir, 2010, 26(6), 4514-4522.

* cited by examiner

PRODUCT HAVING ULTRAVIOLET RADIATION PROTECTION

CROSS REFERENCE TO RELATED APPLICATIONS

This application is a continuation of U.S. patent application Ser. No. 16/699,911 filed on Dec. 2, 2019, which was a continuation of U.S. patent application Ser. No. 15/951,834 filed on Apr. 12, 2018, which is now U.S. Pat. No. 10,494,528, which was a continuation of U.S. patent application Ser. No. 15/064,242 filed on Mar. 8, 2016, which was a continuation-in-part of U.S. patent application Ser. No. 14/833,317 filed on Aug. 24, 2015, which is now U.S. Pat. No. 9,404,214, which was a continuation of U.S. patent application Ser. No. 14/245,152 filed on Apr. 4, 2014, which is now U.S. Pat. No. 9,150,824, which was a continuation of U.S. patent application Ser. No. 13/632,223 filed on Oct. 1, 2012, which is now U.S. Pat. No. 8,690,964, which was a continuation-in-part of U.S. patent application Ser. No. 13/317,152 filed on Oct. 11, 2011, which is now U.S. Pat. No. 8,277,518.

BACKGROUND

This disclosure relates to an additive for incorporating ultraviolet radiation (UV) protection into a polymer, and more specifically, to an additive for incorporating UV protection into a synthetic polymer with the additive and the synthetic polymer for use in manufacturing a synthetic fabric, yarn, textile or garment.

Ecological friendly fabrics or Eco-friendly fabrics are gaining in popularity and use in clothing. An Eco-friendly fabric may be a natural fiber such as cotton, hemp, or bamboo which has been grown in soil that has not been treated with pesticides for a number of years. Some examples of other Eco-friendly fabrics are organic cotton, sisal, a combination of hemp and recycled rayon, a combination of hemp and cotton, broadcloth, denim, linen, and a combination of bamboo and recycled rayon. Natural fibers, which may be derived from plants or animals, such as wool, angora, silk, alpaca, cashmere, and silk are also examples of Eco-friendly fabrics. Synthetic fabrics, which may be made from synthetic sustainable products, such as nylon, rayon, olefin, spandex, and tencel are also examples of Eco-friendly fabrics.

To assist an individual in determining whether a garment has protection against ultraviolet radiation, a rating system has been developed. This rating system is known in the industry as the UPF (Ultraviolet Protection Factor) rating system. Clothing having a rating of UPF 50 are able to block out 98% of the sun's ultraviolet radiation. Further, by way of example, a garment having a rating of UPF 15-24 will only block out 93.3% to 95.9% of ultraviolet radiation. Exposure to the sun's harmful ultraviolet radiation (known as UVA/UVB rays) can damage the skin, can cause sunburn, and can lead to skin cancer over prolonged exposure.

There are a number of factors that affect the level of ultraviolet radiation protection provided by a fabric and the UPF rating. Some factors are the weave of the fabric, the color of the fabric, the weight of the fabric, the fiber composition of the fabric, the stretch of the fabric, moisture content of the fabric. If the fabric has a tight weave or a high thread count then the fabric will have a higher UPF rating. However, even though the fabric has a higher UPF rating, the fabric may be less comfortable because a tighter weave or higher thread count means that the fabric is heavy or uncomfortable to wear. Another factor that affects protection is the addition of chemicals such as UV absorbers or UV diffusers during the manufacturing process. As can be appreciated, some of the features that make a garment comfortable to wear also make the garment less protective. A challenge for a clothing manufacturer is to provide clothing having both protection from the sun and being comfortable to wear.

Athletic clothing or active wear clothing is typically manufactured from synthetic material such as polyester or nylon. Polyester may be formed into a filament yarn that is used to weave a fabric or garment. To form polyester, dimethyl terephthalate is placed in a container and first reacted with ethylene glycol in the presence of a catalyst at a temperature of 302-410° F. The resulting chemical, a monomer alcohol, is combined with terephthalic acid and raised to a temperature of 472° F. Newly-formed polyester, which is clear and molten, is extruded through a slot provided in the container to form long ribbons. the long molten ribbons are allowed to cool until they become brittle. The ribbons are cooled and then cut into tiny polymer chips. These tiny polymer chips are then melted at 500-518° F. to form a syrup-like melt or liquid. This melt is put into a metal container called a spinneret and forced through its tiny holes to produce special fibers. The emerging fibers are brought together to form a single strand. This strand is wound on a bobbin for further processing or to be woven into yarn.

Therefore, it would be desirable to provide an additive for incorporating ultraviolet radiation protection into a polymer prior to a polymer yarn being fabricated. Moreover, there is a need for a process for incorporating UV protection into a polymer so that the polymer may be further processed into a yarn that may be used to manufacture a fabric so that the fabric may be used to protect an individual from UV radiation. Furthermore, it would be advantageous to incorporate adequate protection in a garment, fabric, or textile to protect against exposure to UV radiation, to increase the UV resistance of a garment, fabric, or textile, or to enhance UV radiation absorption of a garment, fabric, or textile to protect an individual from UV radiation.

BRIEF SUMMARY

In one form of the present disclosure, an additive for incorporating ultraviolet radiation protection into a synthetic polymer with the additive and the synthetic polymer for forming a synthetic material is disclosed which comprises a quantity of zinc oxide particles modified with a layer of a reactive group that forms a bond with a synthetic polymer having C—H bonds.

In another form of the present disclosure, an additive for incorporating ultraviolet radiation protection into a synthetic polymer with the additive and the synthetic polymer for forming a synthetic material is disclosed which comprises a quantity of zinc oxide particles and a quantity of a phosphoether of 4-hydroxybenzophenone.

In yet another form of the present disclosure, a method for preparing an additive for incorporating ultraviolet radiation protection into a synthetic polymer with the additive and the synthetic polymer for forming a synthetic material comprises the steps of suspending a quantity of zinc oxide particles in a solution of 98% ethyl alcohol, suspending a quantity of benzophenone silane linker in the solution of zinc oxide particles and 98% ethyl alcohol, adjusting the pH of the solution of zinc oxide particles, 98% ethyl alcohol, and benzophenone silane linker to 12, placing the pH adjusted solution of zinc oxide particles, 98% ethyl alcohol, and benzophenone silane linker into a centrifuge, recovering the zinc oxide particles prepared by centrifugation after a period of time, and drying the recovered prepared zinc oxide particles.

The present disclosure provides an additive for incorporating ultraviolet radiation protection into a polymer to be used to produce or manufacture a fabric which is lightweight and can be worn in any temperature.

The present disclosure provides an additive for incorporating ultraviolet radiation protection into a polymer for providing enhanced protection from both UVA and UVB radiation.

The present disclosure also provides an additive for incorporating ultraviolet radiation protection into a polymer which retains ultraviolet radiation protection after use or after cleaning.

The present disclosure provides an additive for incorporating ultraviolet radiation protection into a polymer to be used to produce or manufacture a fabric which is comfortable to wear.

The present disclosure provides an additive for incorporating ultraviolet radiation protection into a polymer which also has antimicrobial protection incorporated therein.

The present disclosure also provides an additive for incorporating ultraviolet radiation protection into a polymer which can be manufactured without increasing the cost of the polymer.

The present disclosure provides an additive for incorporating ultraviolet radiation protection into a polyester that is incorporated into active wear clothing or athletic clothing.

The present disclosure is directed to an additive for incorporating ultraviolet radiation protection into a polymer, such as a synthetic polymer, that is used to produce a synthetic yarn that is employed to manufacture a fabric or garment.

DETAILED DESCRIPTION OF A PREFERRED EMBODIMENT

Various methods or processes are disclosed herein for the immobilization of UV-blocking nanoparticles on Eco-friendly fabric to incorporate UV protection in the fabric. Once the UV-blocking nanoparticles are attached, the Eco-friendly fabric will be able to protect a wearer of the fabric from UV radiation. One method comprises direct immobilization from in situ formation of the particles. A second method comprises carboxylation or phosphorylation of the fabric followed by binding of the UV-blocking nanoparticles to the modified fabric. A third method comprises modifying UV-blocking nanoparticles with a self-assembled monolayer (SAM) or polymer layer containing an active chemical group capable of binding to the fabric and deposited on the fabric from solution.

ZnO (zinc oxide) nanoparticles are generally formed by the precipitation of a zinc salt (acetate, sulfate, nitrate, chloride) using either aqueous hydroxide or an amine. The following examples disclose direct immobilization from in situ formation of the ZnO nanoparticles.

Example 1 Solution Sol-Gel Process, Hydroxide Base 4.39 g. zinc acetate (20 mmol) is dissolved in 100 mL deionized or distilled water. A textile is added to this solution and 100 mL 0.4M NaOH is added while mixing. The suspension is mixed for 2 hours to form a suspension of zinc oxide nanoparticles in contact with the fabric. The textile is removed from the nanoparticle suspension and laundered in a household washing machine. As can be appreciated, a fabric may be treated to have ultraviolet radiation protection incorporated in the fabric by the steps of dissolving zinc acetate or other zinc salt in a liquid to form a solution containing Zn(II) ions, adding a fabric to the solution, mixing the solution and the fabric, and adding a base to the solution when the solution and the fabric are being mixed to form a suspension of zinc oxide nanoparticles in contact with the fabric.

Example 2 Solution Sol-Gel Process, Amine Base 4.39 g. zinc acetate (20 mmol) is dissolved in 100 mL deionized water. A textile is added to this solution while mixing and 40 mmol amine is added while mixing. Amines used may include ethanolamine, ethylenediamine, (tris)hydroxymethylaminomethane, or others. The textile is removed from the nanoparticle suspension and laundered in a household washing machine.

Example 3 Mechanochemical Process 5.75 g. zinc sulfate heptahydrate (20 mmol) and 0.88 g (15 mmol) sodium chloride are powered finely and blended, then placed with a textile in a ball mill or similar mechanical mixer. 1.6 g (40 mmol) sodium hydroxide is powdered and added to the mixer. After twenty minutes, the textile is removed and rinsed thoroughly with water.

The following examples disclose carboxylation or phosphorylation of the fabric followed by binding of the UV-blocking nanoparticles to the modified fabric.

Example 4 Modification of Textile with Phosphonic Acid Groups

For this process it will be necessary to modify a textile with phosphonic acid groups. This can be accomplished in a number of ways, but it is desirable to use materials that are non-toxic and/or renewably sourced chemicals. Phosphorylated cellulose should form covalent linkages with ZnO and $TiO_2$ nanoparticles. The interaction between phosphonates and oxide surfaces are used for modification of the oxide surfaces. In essence, the procedure consists of condensing the cellulose textile with a bis(phosphonic acid), phosphonate, or phosphate species, either organic or inorganic. Urea may be added to forestall discoloration of the textile. Phosphorylation takes place driven by the elimination of water. The resulting phosphorylated textile will directly bind both zinc oxide and titanium oxide nanoparticles. It will be necessary to restrict the degree of phosphorylation of the textile to prevent great alteration in the properties of the textile by controlling a reaction time. This process does not require in situ synthesis of the zinc oxide nanoparticles. Commercially available zinc oxide nanoparticles may be used.

A sample of cotton textile is wetted with a 10% v/v solution of phosphoric acid or bis-phosphonic acid containing 10-30% w/v urea. The textile is pressed to remove excess solution and baked in an oven at 85-100° C. for 5 minutes to dry, then at 170° C. for 2-4 minutes to cure unreacted groups. The textile is removed from the oven and washed with water. The textile is then used without further modification in subsequent deposition steps.

Example 5 Modification of a Textile by Partial TEMPO-$H_2O_2$ Oxidation

A sample of cotton textile (ca. 1 g) is added to a solution composed of 90 mL water with 10 mg (0.065 mmol)

TEMPO and 0.22 g (2 mmol) sodium bromide. Hydrogen peroxide 3% is added (0.9 mL, 1 mmol) and the reaction stirred at RT for 10 minutes to 2 hours. The material is washed with water, dried, and used without further modification in the following ZnO deposition step.

Example 6 Immobilization of Nanoparticles on a Phosphorylated or Carboxylated Cellulose Surface Ca. 1 mg/mL nanoparticles are suspended in water, ethyl alcohol, or other solvent. The phosphorylated or carboxylated cellulose textile is added to the suspension and the suspension is gently mixed over a reaction period of 1 to 12 hours. The textile is removed from the suspension and subjected to tumble drying or another drying procedure to force surface condensation and cure remaining groups.

The following example discloses modifying UV-blocking nanoparticles with a self-assembled monolayer (SAM) or polymer layer containing an active chemical group capable of binding to the fabric and deposited on the fabric from solution.

Example 7 Grafting to Attachment of Cellulose to Nanoparticles Through Reactive Groups In this method, ZnO particles are synthesized separately by any of the means discussed in Examples 1-3 or the ZnO particles may be purchased commercially. The ZnO particles are suspended in water or a weak non-nucleophilic aqueous buffer and an organosilane or phosphonate with one of the given combinations of reactive groups, as shown in Table 1, is added. Multidentate ligand or polymeric silanes may also be added to this mixture to facilitate the formation of a durable reactive layer and an oxide, alkoxide, or salt of another metal such as Ti or Si may be added first to form a surface layer of another oxide in the ZnO particles. After a reaction time of 1 to 12 hours, the particles are collected by centrifugation and washed with water. The particles are then resuspended in water or buffer and added to the textile. The conditions for binding of the particles to the textile vary depending on the headgroup, as shown in Table 1, but may involve direct application of the particles to the textile similarly to the process disclosed in Example 6, raising the pH of the suspension containing the textile, or heating the textile either in or after removal from the suspension. This process has the advantage of yielding extremely fine control over the nature of the linkage between particle and textile. This process has a further advantage in that the treated textile will be durable due to the robustness of self-assembled siloxane layers on oxide.

TABLE 1

| Molecule name (if commercially available) | Linker | Headgroup | Commercially available? |
| --- | --- | --- | --- |
| 3-glycidoxypropyl-triethoxysilane | Triethoxysilane | Glycidyl ether | Yes |
| 2-(3,4-cyclohexyloxy) ethyltriethoxysilane | Triethoxysilane | Cyclohexyl oxide | Yes |
| Hydroxymethyl-triethoxysilane | Triethoxysilane | Hydroxymethyl | Yes |
| Isocyanatopropyl trimethoxysilane | Trimethoxysilane | Isocyanate | Yes |
| Bis(triethoxysilyl) ethane | Triethoxysilane (2) | N/A | Yes |
| 6-azidosulfonylhexyl triethoxysilane | Triethoxysilane | Axidosulfonyl | Yes |

TABLE 1-continued

| Molecule name (if commercially available) | Linker | Headgroup | Commercially available? |
| --- | --- | --- | --- |
| | Triethoxysilane | Vinylsulfone | No |
| | Triethoxysilane | Aryl azide | No |
| | Phosphonate | Glycidyl ether | No |
| | Phosphonate | Cyclohexyl oxide | No |
| | Phosphonate | Azidosulfonyl | No |
| | Phosphonate | Vinylsulfone | No |
| | Phosphonate | Aryl azide | No |
| Bis(triethoxysilyl) propylamine | Triethoxysilane (2) | Secondary amine | Yes |
| APTES/EGDE | Triethoxysilane | Amine/Ethylene glycol diglycidyl ether | Yes, 2 components |

The terms "fabric" or "textile" are intended to include fibers, filaments, yarn, melt, textiles, material, woven and non-woven fabric, knits, and finished products such as garments. The methods described herein may be used in treating fibers, filaments, yarn, textiles, and fabrics. For example, fibers may be initially treated by use of one or more of the disclosed methods and the fibers may be manufactured into a fabric or a textile. Once manufactured into a fabric, the fabric may be treated by use of one or more of the disclosed methods. In this manner, individual fibers and the entire fabric are treated to incorporate UV protection. As can be appreciated, the treated fabric may be used to manufacture a garment such as, by way of example only, shirts, pants, hats, coats, jackets, shoes, socks, uniforms, athletic clothing, and swimwear. It is also possible and contemplated that the treated fabric may be used to construct non-apparel items such as blankets, sheets, sleeping bags, backpacks, and tents.

Further, it is also possible to further modify ZnO particles with a thin layer of other oxides in a "core-shell" type procedure by adding a reactive precursor to a suspension of the ZnO oxides. Oxides that can be deposited in this manner include $SiO_2$ from tetraethoxysilane (TEOS) or sodium silicate, and $Al_2O_3$ and $TiO_2$ either from the appropriate alkoxides, aluminate/titanate compounds, or other hydrolyzable aluminum or titanium compounds. A second oxide shell of this type may enhance the formation and stability of both directly applied ZnO-textile conjugates and those formed by modification of nanoparticles with an organic monolayer. ZnO can also be modified by the addition of a multidentate silane along with a silane containing the desired functional group. The multidentate silane yields a more densely cross-linked siloxane surface than monodentate silanes alone, forming a more stable layer on ZnO.

Although the above examples and methods are applicable to the manufacturing process in which ultraviolet radiation protection is incorporated into the fabric, textile, or garment when initially produced, the following discloses various methods of incorporating ultraviolet radiation protection directly to clothing being laundered. By use of the following methods, a garment after purchase may be made a protected garment by an end user.

In general, the methods may comprise the self-assembly of certain polyanionic materials onto a ZnO surface to create a linker which will bind the particles to a cellulose (cotton) surface. Several acidic or oxyanion functional groups are capable of self-assembly onto ZnO. These functional groups include siloxane, silanol, carboxylic acid, carboxylate, phosphonic acid, phosphonate, boronic acid or other groups capable of binding to oxide layers. Boronic acid is capable of forming very strong interactions with carbohydrates, including the glycosidically linked glucose units making up cellulose. One method or approach is to prepare a polymer bearing boronic acid groups and use that polymer to bind ZnO to cotton.

Various methods or processes are disclosed herein for the treatment of fabric to incorporate UV protection in the fabric by use of a laundry additive. One method is identified as the cellulose-to-oxide method. A second method is termed the oxide-to-cellulose method. A third method is described as the free mixing method.

Example 8 The Cellulose-to-Oxide Method

In this method, cotton garments are pre-treated with boronic acid polymer resulting in cloth or fabric coated with boronic acid groups capable of binding to suspended uncoated ZnO particles. A home washing machine having the capability of adding a substance on a delayed basis may be used. In particular, boronic acid polymer is added to laundry detergent or added at the beginning of the laundry cycle. A suspension of ZnO particles may be added to a compartment in the washing machine that will dispense the particles on a delayed basis. For example, several washing machines have a compartment for storing bleach which is dispensed later on in the laundry cycle. The suspension of ZnO particles may be placed in the bleach compartment to be dispensed at the time that bleach would normally be dispensed into the washing machine. The washing machine would initially mix the clothing with the boronic acid material. This will result in the clothing bearing boronate groups. At the end of the delayed period the washing machine will dispense the suspension of ZnO particles into the washing machine. The ZnO particles will bind to the boronate groups and become attached to the clothing. It is also possible and contemplated that the suspension of ZnO particles may be manually added to the washing machine in a delayed manner. Manually adding the suspension may be required if the washing machine is not equipped with a compartment for adding bleach on a delayed basis.

Example 9 Oxide-to-Cellulose Method

In this method, ZnO particles are treated with boronic acid polymer. Once prepared, these particles may be either mixed with laundry detergent and distributed in that form or sold as a separate additive that may be added to laundry detergent. The particles mixed with the laundry detergent or the separate additive is used in the washing machine as normal. During the course of the wash cycle, the boronic acid groups attach to the ZnO particles would assemble on and bind to cotton or other cellulose clothing. This results in a ultraviolet protected garment.

Example 10 Free Mixing Method

In this method, boronic acid polymer and ZnO particles (untreated) are incorporated into the laundry detergent preparation in the solid phase. When added to a laundry cycle or wash cycle the detergent and water will solubilize these materials causing boronic acid polymer to assemble on both ZnO and cellulose. This will result in linked ZnO material. This method may require more boronic acid polymer and ZnO particles then the more controlled methods disclosed in Examples 8 and 9 to yield adequate grafting densities of ZnO on clothing.

Use of any of the methods disclosed in Examples 8, 9, or 10 will result in ZnO particles being bound to the fabric that is being washed in a conventional household washing machine. Once the ZnO particles are bound to the fabric, the fabric will have incorporated therein ultraviolet radiation protection. It is also possible and contemplated that the various methods described in Examples 8, 9, and 10 may be used more than once to incorporate ultraviolet radiation protection into clothing. For example, clothing may be treated by use of one or more of these methods and over time and after numerous washings the ultraviolet radiation protection may diminish. If there is any concern about the ultraviolet radiation protection of the garment, the garment may be washed using the various methods discussed in Examples 8, 9, and 10. Further, it is possible that a consumer may purchase a garment that has been treated using the methods described in Examples 1-7. Again, over time the ultraviolet radiation protection of the garment may decline. The consumer may use the methods disclosed in Example 8, 9, and 10 to wash the garment to again incorporate ultraviolet radiation protection into the garment.

All synthetic material such as polyester and nylon that is used in the manufacture of athletic clothing or active wear clothing may be rendered UV-absorbing using a ZnO preparation. These types of fabrics may resist treatment using the methods as outlined with respect to Examples 8, 9, and 10. One solution to this problem is to prepare ZnO particles coated with functional groups capable of being grafted directly to polyester or nylon materials. This may be accomplished by using benzophenone photografting chemistry. The following examples and methods are applicable to the manufacturing process in which ultraviolet radiation protection is incorporated into the artificial or synthetic composition, polymer, fabric, textile, or garment when initially produced.

The following methods provide for the direct grafting of ZnO particles to nonpolar, non-natural polymers such as nylon and polyester. Nylon and polyester have little in the way of chemical functionality, containing only aliphatic and aromatic C—H bonds and amide or ester linkages between monomers. The method is capable of directly functionalizing C—H bonds. The following method describes preparing ZnO particles coated with functional groups capable of being grafted directly to polyester or nylon materials by using the photografting reaction of benzophenone.

Example 11 Grafting ZnO onto Artificial or Synthetic Fibers

In this method, an artificial fabric composed of polyester, nylon, or other polymer lacking hydroxyl functional group is modified by use of a preparation of a zinc oxide particle modified with a layer of reactive groups capable of C—H activation. Examples of the reactive functional group capable of C—H activation are benzophenone, sulfonylazides, aryl azides, or diazonium salts. The prepared particles are coated onto the fabric and a reaction is initiated using UV light, heat, or both. By way of example only, a mercury-vapor UV lamp may be used and the time for exposure may be one hour. Unbound particles are washed off the fabric. This second step, a curing step, bonds the prepared particles to the fabric. This method adds a second UV-absorbing chromophore which cross-links and becomes further bonded to the polymer surface of the fabric upon exposure to UV light. In this method, zinc oxide particles can be composed of pure zinc oxide or zinc oxide coated with aluminum, titanium, or silicon oxides in a core-shell configuration. The result is an artificial fabric with photografted zinc oxide particles.

By way of example, the zinc oxide particles were prepared in the following manner. Five grams of zinc oxide nanoparticles were used and suspended in a solution of 98% ethyl alcohol. Two grams of benzophenone silane linker were suspended in this solution and the pH of the solution was adjusted to 12. After twelve hours, the zinc oxide particles were recovered by centrifugation and dried overnight at 50-60° C. in an oven.

It is also possible to prepare a phosphoether of 4-hydroxybenzophenone and use this self-assembling molecule to functionalize ZnO particles. The resulting particles, having a monolayer of nonpolar molecules, will be substantially nonpolar and will adhere to nonpolar polyester and nylon. In order to bond the particles to the polymer surface an UV light may be used to initiate a reaction. Again, the process has the advantage of adding a second UV absorbing chromophore which cross-links and becomes further bonded to the polymer surface upon exposure to UV light.

The following describes an additive for incorporating UV protection into a polymer prior to the polymer being placed into a spinneret or prior to the polymer being formed into fibers. Nylon and polyester have little in the way of chemical functionality, containing only aliphatic and aromatic C—H bonds and amide or ester linkages between monomers. The additive is capable of directly functionalizing C—H bonds.

Example 12 Additive

An artificial fabric composed of polyester, nylon, or other polymer lacking hydroxyl functional group is modified by use of an additive of a quantity of zinc oxide particles modified with a layer of a reactive group that forms a bond with a synthetic polymer having C—H bonds. Examples of the reactive functional group capable of C—H activation are benzophenone, sulfonylazides, aryl azides, diazonium salts, isocyanate, oxime, and azo. The prepared particles may be added to the synthetic polymer prior to the synthetic polymer being placed into a spinneret. Further, it is also contemplated that the additive may be packaged with the synthetic polymer and the packaged additive and synthetic polymer may be placed into the spinneret. The modified zinc oxide particles can also be coated with aluminum, titanium, or silicon oxides in a core-shell configuration.

By way of example, the zinc oxide particles were prepared in the following manner. a quantity of zinc oxide particles was suspended in a solution of 98% ethyl alcohol, a quantity of benzophenone silane linker was suspended in the solution of zinc oxide particles and 98% ethyl alcohol, the pH of the solution of zinc oxide particles, 98% ethyl alcohol, and benzophenone silane linker was adjusted to 12, the pH adjusted solution of zinc oxide particles, 98% ethyl alcohol, and benzophenone silane linker was placed into a centrifuge, the zinc oxide particles prepared by centrifugation was recovered after a period of time, and the recovered prepared zinc oxide particles were dried. By further way of example only, five grams of zinc oxide nanoparticles were used and suspended in a solution of 98% ethyl alcohol. Two grams of benzophenone silane linker were suspended in this solution and the pH of the solution was adjusted to 12. After twelve hours, the zinc oxide particles were recovered by centrifugation and dried overnight or for eight hours at 50-60° C. in an oven.

By way of example only and in not a limiting sense, it is also possible to prepare a phosphoether of 4-hydroxybenzophenone and use this self-assembling molecule to functionalize ZnO particles. The resulting particles, having a monolayer of nonpolar molecules, will be substantially nonpolar and will adhere to nonpolar polyester or nylon. The resulting or modified zinc oxide particles can also be coated with aluminum, titanium, or silicon oxides in a core-shell configuration. Further, it is to be understood that many other benzophenone derivatives are suitable for use to prepare a self-assembling molecule to functionalize ZnO particles.

From all that has been said, it will be clear that there has thus been shown and described herein an additive for incorporating ultraviolet radiation protection into a polymer which fulfills the various advantages sought therefore. It will become apparent to those skilled in the art, however, that many changes, modifications, variations, and other uses and applications of the subject additive for incorporating ultraviolet radiation protection into a polymer are possible and contemplated. All changes, modifications, variations, and other uses and applications which do not depart from the spirit and scope of the disclosure are deemed to be covered by the disclosure, which is limited only by the claims which follow.

What is claimed is:

1. A product having ultraviolet radiation protection and antimicrobial protection comprising:
    a quantity of synthetic polymer chips having C—H bonds;
    a quantity of zinc oxide particles with each particle having a surface; and
    a quantity of a reactive group for modifying each surface of each zinc oxide particle, the quantity of the reactive group sufficient for forming a bond with the quantity of synthetic polymer chips prior to the quantity of synthetic polymer chips being formed into a fiber, wherein the reactive group is azo.

2. The product of claim 1 wherein the reactive group further comprises oxime.

3. The product of claim 1 wherein the reactive group further comprises sulfonylazides.

4. The product of claim 1 wherein the reactive group further comprises aryl azides.

5. The product of claim 1 wherein the reactive group further comprises diazonium salts.

6. The product of claim 1 wherein the zinc oxide particles are coated with aluminum.

7. The product of claim 1 wherein the zinc oxide particles are coated with titanium.

8. The product of claim 1 wherein the zinc oxide particles are coated with silicon oxides.

9. A product for incorporating ultraviolet radiation protection and antimicrobial protection into a synthetic material prior to the synthetic material being formed by use of a spinneret comprising:
    a quantity of synthetic polymer chips having C—H bonds;
    a quantity of zinc oxide particles;
    a quantity of a phosphoether of 4-hydroxybenzophenone for modifying each surface of each zinc oxide particle, the quantity of phosphoether of 4-hydroxybenzophenone sufficient for forming a bond with the quantity of synthetic polymer chips prior to the quantity of synthetic polymer chips being formed into a fiber; and
    a quantity of a reactive group for modifying each surface of each zinc oxide particle, the quantity of the reactive group sufficient for forming a bond with the quantity of synthetic polymer chips prior to the quantity of synthetic polymer chips being formed into a fiber, wherein the reactive group is azo.

10. The product of claim 9 wherein the zinc oxide particles are coated with aluminum.

11. The product of claim 9 wherein the reactive group further comprises benzophenone.

12. The product of claim 9 wherein the zinc oxide particles are coated with silicon oxides.

13. The product of claim 9 wherein the synthetic polymer chips are a polyester.

14. The product of claim 9 wherein the synthetic polymer chips are a nylon.

15. A product for incorporating ultraviolet radiation protection and antimicrobial protection into a synthetic polymer prior to forming a synthetic material comprising:
a quantity of synthetic polymer chips having C—H bonds;
a quantity of ethyl alcohol;
a quantity of zinc oxide particles with each particle having a surface;
a quantity of benzophenone for modifying each surface of each zinc oxide particle, the quantity of benzophenone sufficient for forming a bond with the quantity of synthetic polymer chips prior to the quantity of synthetic polymer chips being formed into a fiber; and a quantity of a reactive group for modifying each surface of each modified zinc oxide particle, the quantity of the reactive group sufficient for forming a bond with the quantity of synthetic polymer chips prior to the quantity of synthetic polymer chips being formed into the synthetic material, wherein the reactive group is azo.

16. The product of claim 15 wherein the reactive group further comprises isocyanate.

17. The product of claim 15 wherein the zinc oxide particles are coated with aluminum.

18. The product of claim 15 wherein the zinc oxide particles are coated with titanium.

19. The product of claim 15 wherein the reactive group further comprises oxime.

20. The product of claim 15 wherein the reactive group further comprises aryl azides.

* * * * *